United States Patent

[11] 3,609,306

[72] Inventor Lawrence W. Langley
Severna Park, Md.

[21] Appl. No. 883,234

[22] Filed Dec. 8, 1969

[45] Patented Sept. 28, 1971

[73] Assignee General Electric Company
Continuation of application Ser. No. 419,662, Dec. 21, 1964, now abandoned.

[54] SEQUENTIAL CODE READER

21 Claims, 4 Drawing Figs.

[52] U.S. Cl. 235/61.11 E, 250/219 D

[51] Int. Cl. G06k 7/10, G01n 21/30

[50] Field of Search 235/61.11, 61.115, 61.7; 340/146.3 XX; 250/219, 209, 223; 209/110, 111.5, 111.7

[56] References Cited

UNITED STATES PATENTS

| | | | |
|---|---|---|---|
| 2,749,533 | 6/1956 | Daniels | 235/61.7 UX |
| 3,117,754 | 1/1964 | Morganstern | 235/61.11 E |
| 3,122,237 | 2/1964 | Stenstrom | 235/61.11 E |
| 3,225,175 | 12/1965 | Hyypolainen | 235/61.7 |
| 3,310,658 | 3/1967 | Ryer | 235/61.11 |

*Primary Examiner*—Daryl W. Cook

*Attorneys*—Michael Masnik, Frank L. Neuhauser, Oscar B. Waddell and Joseph B. Forman

ABSTRACT: A sequential reading code recognition system for recognizing the code on moving objects to regulate the movement of these objects as the codes thereon are recognized. Three scanners are employed for each station. The first scanner detects the presence of an object and enables the outputs of the other two code reading scanners to be received by the storage unit. The storage unit for the code recognition system for each station contains a preset code. When the code on the object corresponds to the preset code on a bit-by-bit basis an action initiating output is generated.

PATENTED SEP 28 1971 3,609,306

SHEET 1 OF 3

INVENTOR.
LAWRENCE W. LANGLEY
BY James G. Williams
HIS ATTORNEY

INVENTOR.
LAWRENCE W. LANGLEY
BY James G. Williams
HIS ATTORNEY

INVENTOR.
LAWRENCE W. LANGLEY
BY James g. Williams
HIS ATTORNEY

SEQUENTIAL CODE READER

The present invention is a continuation of my copending application Ser. No. 419,662, now abandoned filed Dec. 21, 1964, and assigned to the same assignee as the present invention.

The invention relates to a sequential code reader, and particularly to a sequential code reader for reading a code, in the form of sequential bits of indicia, on a moving object.

In some automated warehouses, articles or cartons are placed on a moving conveyor and dispatched or diverted from the conveyor at lanes or locations in a predetermined manner. For example, cartons of commodities are provided with coded indicia or marking which indicate the nature of the commodities in the cartons. These cartons are placed one after another on a moving conveyor. As the cartons are moved by the conveyor, their indicia are read and utilized so that each of the cartons may be dispatched or diverted from the conveyor at the desired lane or location.

It is an object of the invention to provide a novel and improved sequential code reader.

Another object of the invention is to provide a novel and improved system which can read a code in a sequence as an object carrying the code moves by, and which responds if the code so read is a predetermined code.

Present code readers are of the multiple or parallel type. Such types use a code that is read at the same time. If, as is usually the case, the code requires a relatively large number of bits of indicia, then a correspondingly large number of reading elements are required. Also, such types are relatively sensitive to misplacement of the article carrying the code or to misplacement of the code on the article.

Accordingly, another object of the invention is to provide a sequential code reader which requires relatively few reading elements.

Another object of the invention is to provide a sequential code reader that is relatively insensitive to misplacement of the article carrying the code or to misplacement of the code on the article.

Another object of the invention is to provide a novel code reader that sequentially reads bits of indicia in one of two rows, and that produces an output in response to a predetermined sequence of bits so read.

Briefly, these and other objects are achieved in accordance with the invention by two reading elements which respectively read bits of indicia in two rows on an article. The bits are arranged in a predetermined sequence in the two rows so that only one of the two reading elements reads a bit as it passes. As the bits are so read, storage devices are activated if the sequence of the bits on the two rows corresponds to a preset condition of the storage devices. If, after all the bits are read, all of the storage devices are activated, then the appropriate code for the preset condition of the storage devices has been read. This condition may be utilized in any way desired, such as to dispatch or divert the article carrying the code.

The invention is particularly pointed out in the claims. The invention may be better understood from the following description given in connection with the accompanying drawing, in which:

Figure 1:
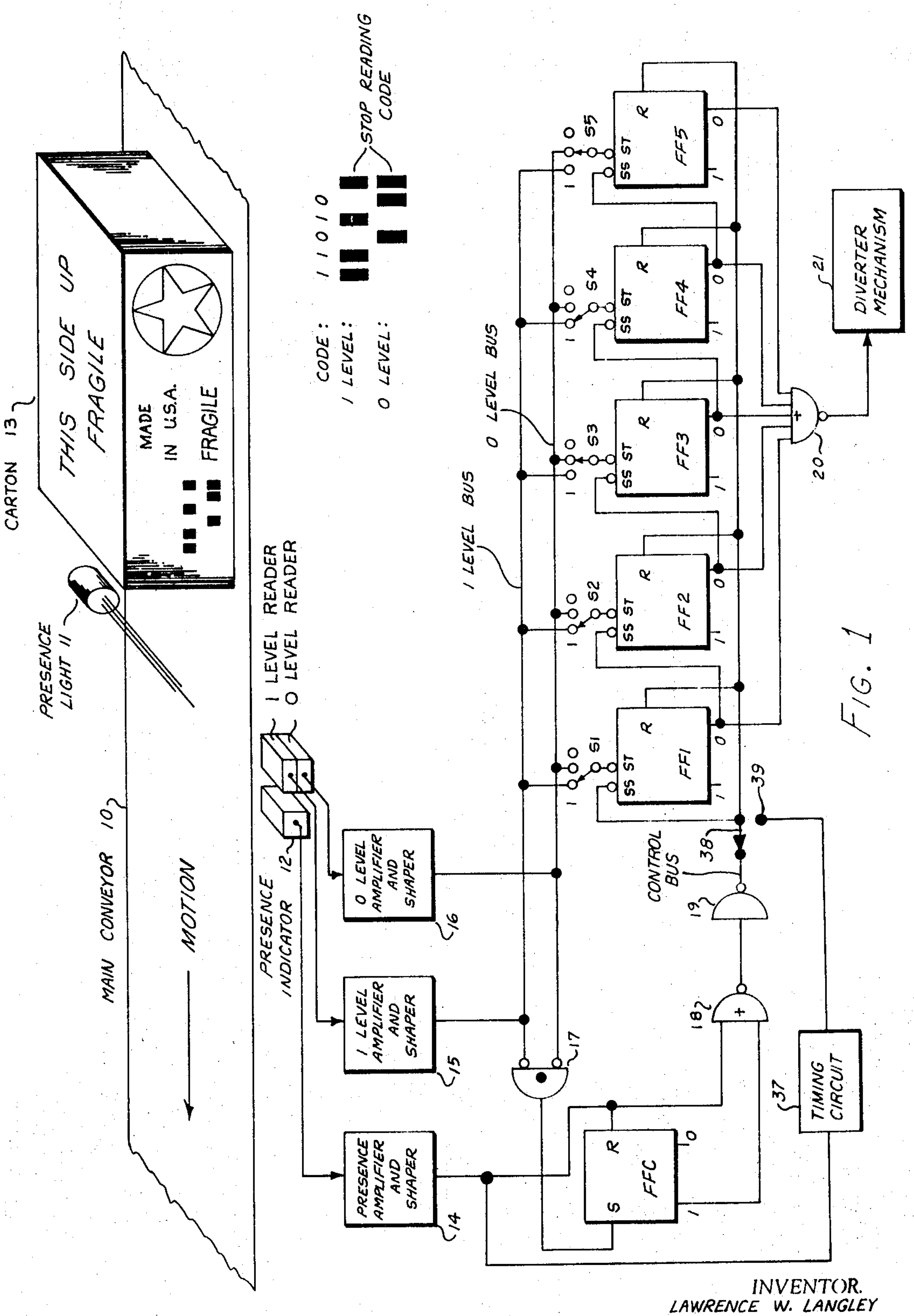
FIG. 1 shows a perspective view of a conveyor with a carton carrying a sequential code, and a diagram of the sequential code reader of the invention as used with the conveyor.
Figure 2:
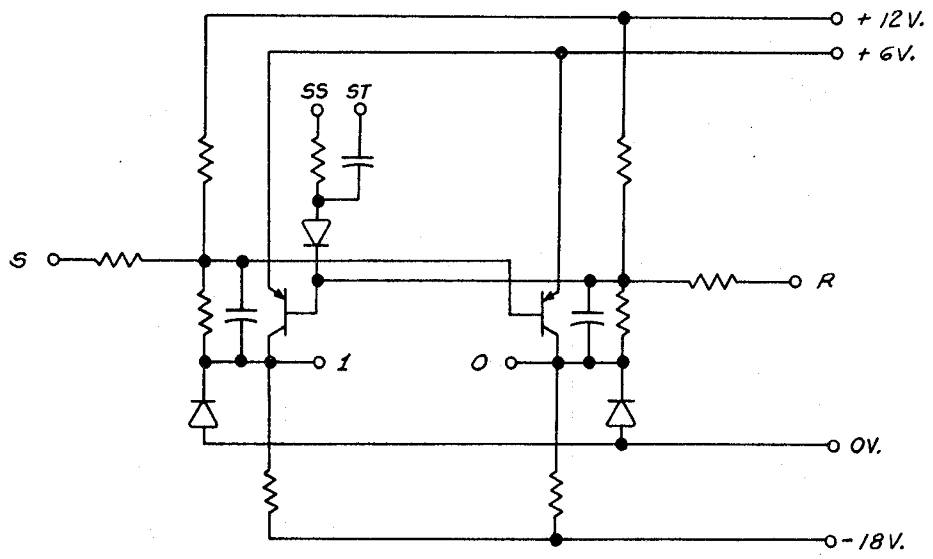
FIG. 2 shows a circuit diagram of the flip-flops which may be used in the code reader of FIG. 1.

In FIG. 1, the sequential code reader of the invention has been shown as used with a main conveyor 10 that carries articles such as a carton 13 from some loading point (not shown) which would be positioned to the right of the main conveyor 10 as viewed in FIG. 1. This main conveyor 10 comprises a movable belt that moves from right to left by some means (not shown). The main conveyor 10 carries or moves cartons so that each such carton may be diverted or dispatched at a predetermined lane or location along the conveyor 10. The code reader of the invention reads the code on the moving cartons and causes the cartons to be dispatched or diverted at predetermined locations to fill an order or to assemble the cartons at predetermined locations. These cartons are provided with an appropriate sequential code in accordance with the invention. In the embodiment of FIG. 1, the code indicates the desired location of the carton. As shown in FIG. 1, this code comprises an arbitrarily designated 1 level or row, and an arbitrarily designated 0 level or row. The 1 level is arbitrarily positioned above the 0 level. This code may be in the form of print or pasted on rectangles, squares, or other figures, and may be either dark or light relative to the background. Since the code is usually printed on a Kraft type cardboard, each bit is usually a printed rectangle having the same dark color as the other printed matter on the carton. In the embodiment shown in FIG. 1, it has been assumed that the code being used has 5 bits of information or indicia which provides possible code combinations. More or less bits may be used. As shown in FIG. 1, the assumed code on the carton 13 is 11010. Thus, the bits or dark rectangles are arranged in the following sequence (relative to the order of reading): the first bit on the 1 level, the second bit on the 1 level, the third bit on the 0 level, the forth bit on the 1 level, and the fifth bit on the 0 level. The code may, if desired, include a stop reading code which may include bits at the end on both the 1 level and the 0 level. The stop reading code, and other alternatives which will be described, may be desirable where there is printed matter, such as shown, near the code. Such printing matter may, if the reader is not stopped after all bits are read, cause erroneous indications.

A presence light 11 is positioned on one side of the conveyor 10 and an associated presence indicator 12 is positioned on the other side of the conveyor 10 opposite the light 11. Normally, in the absence of a carton, the light 11 illuminates the presence indicator 12. The indicator 12 is coupled to a presence amplifier and shaper 14 which will be explained in more detail later. At this point, it will suffice to explain that the presence amplifier and shaper 14 produces a logic 1 (which in this application is 0 volt) at its output when light is received by the presence indicator 12; and produces a logic 0 (which in this application is plus 6 volts) at its output when relatively little light is received by the presence indicator 12. The latter condition exists when a carton intercepts light from the presence light 11.

Adjacent to the presence indicator 12 are a 1 level reader and a 0 level reader which are positioned vertically to respectively read bits on the 1 level and the 0 level on the carton 13. Outputs from the 1 and 0 level readers are respectively coupled to 1 and 0 level amplifiers and shapers 15, 16 which will be explained in more detail later. At this point, it will suffice to explain that the 1 and 0 level amplifiers and shapers 15, 16 respectively produce a logic 1 (0 volt) at their outputs in the absence of a bit of coded indicia, and produce a preferably timed logic 0 (plus 6 volts) at their outputs in response to a bit of coded indicia. These readers are known in the art, and provide light sensitive devices that produce the desired electrical signals in response to the coded bits.

The storage arrangement for the sequential code reader of the invention comprises a control flip-flop FFC and 5 flip-flops indicated by FF and a numeral, the numeral indicating the sequence of the flip-flop in the code. These flip-flops have a set condition or a reset condition as determined by the signals applied to their inputs. When a flip-flop is in the set condition, its output terminal 1 is at a logic 1 and its output terminal 0 is at a logic 0; and when in a reset condition, its output terminal 1 is at a logic 0 and its output terminal 0 is at a logic 1. (As mentioned earlier, a logic 1 is considered to be 0 volt and a logic 0 is considered to be plus 6 volts). Each flip-flop has a set steering input SS, a set trigger input ST, a set input S, and a reset input R. A flip-flop may be set by the application of a logic 1 to its set input S, and may be reset by the application of a logic 1 to its reset input R. A flip-flop may also be set by a logic 0 applied to its set steering input SS followed by the transition from a logic 1 to a logic 0 applied to its set trigger input ST.

FIG. 1 also shows a number of NOR logic gates 17, 18, 20 which are known in the art. Such a NOR gate produces a logic 1 at its output if all of its inputs are at a logic 0. However, if any one of the inputs to a NOR gate is at a logic 1, then the output of the NOR gate is a logic 0. One inverter 19 is also shown in FIG. 1. This inverter 19 produces a logic 0 at its output if a logic 1 is applied to its input, and produces a logic 1 at its output if a logic 0 is applied to its input.

The 1 level reader and the 0 level reader are coupled to respective amplifiers and shapers 15, 16. The output of the 1 level amplifier and shaper 15 is coupled to a 1 level bus, and the output of the 0 level amplifier and shaper 16 is coupled to a 0 level bus. These buses are coupled to the two inputs of the two input NOR gate 17. The output of this gate 17 is coupled to the set input S of the control flip-flop FFC. The presence indicator 12 is coupled to the presence amplifier and shaper 14. The output of the presence amplifier and shaper 14 is coupled to the reset input R of the control flip-flop FFC and also to one input of the two input NOR gate 18. The other input of the NOR gate 18 is coupled to the output terminal 1 of the control flip-flop FFC. The output of the gate 18 is inverted by the inverter 19 and applied to a control bus. This control bus is coupled to each of the reset inputs R of the flip-flops FF1 through FF5 and is also coupled to the set steering input SS of only the flip-flop FF1.

The set trigger inputs ST of the flip-flops FF1 through FF5 are respectively coupled to the movable arms of switches S1 through S5. The arms of these switches S1 through S5 may be coupled either to the 1 level bus or to the 0 level bus. The buses to which the switch arms are coupled determine the code that the flip-flops FF1 through FF5 will respond to. In FIG. 1, the arms of the switches S1 through S5 are positioned for the code 11010. Hence the arms of switches S1 and S2 are coupled to the 1 level bus, the arm of switch S3 is coupled to the 0 level bus, the arm of switch S4 is coupled to the 1 level bus, and the arm of switch S5 is coupled to the 0 level bus. Each output terminal 0 of the flip-flops FF1 through FF5 is respectively coupled to the 5 inputs of the 5 input NOR gate 20. The output of this gate 20 is coupled to a diverter mechanism 21. This mechanism 21 responds to a logic 1. And, a logic 1 will be applied when all flip-flops FF1 through FF5 are in the set condition. Finally, the output terminal 0 of each flip-flop is respectively coupled to the set steering input SS of the subsequent flip-flop. However, no such coupling is made in the case of the flip-flop FF5.

Figure 3:
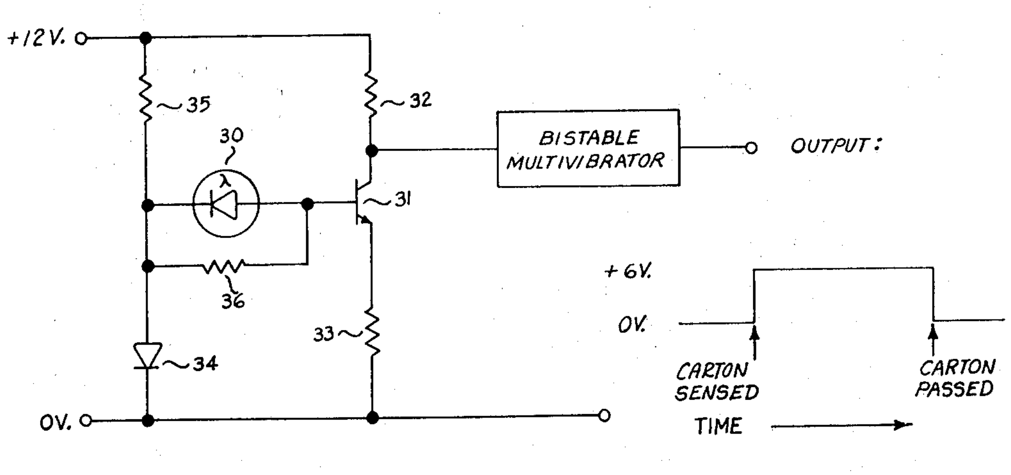
FIGS. 3 and 4 show circuit diagrams of amplifiers and shapers which may be used in the code reader of FIG. 1.

The presence indicator 14 may have a circuit such as shown in FIG. 3. In FIG. 3, the light sensitive device may be a solar cell 30 which is indicated by the diode and letter λ enclosed in a circle. The anode of the solar cell 30 is coupled to the base of an NPN type transistor 31. The transistor collector is coupled through a resistor 32 to a source of direct current potential of =12 volts, and the transistor emitter is coupled through a resistor 33 to a ground bus. The cathode of the solar cell 30 is coupled through a bias diode rectifier 34 to the ground bus, and is also coupled through a resistor 35 to the =12 volt terminal. A resistor 36 may be coupled in parallel with the solar cell 30. Output signals from the circuit of FIG. 3 are derived from the collector of the transistor 31 and may be applied t a bistable multivibrator which produces a substantially square or rectangular wave pulse (as shown by the output wave in FIG. 3) in response to a predetermined low level of light intensity on the solar cell 30. Such darkness would be produced by a carton passing between the presence light 11 and the presence indicator 12. When the light intensity on the solar cell 30 falls below some predetermined magnitude, the transistor 31 stops conducting. This condition triggers the bistable multivibrator so that it produces an output of plus 6 volts (logic 0). When the light intensity on the solar cell exceeds a predetermined magnitude, the transistor 31 conducts again and the output of the multivibrator returns to its 0 volt (logic 1) condition.

Figure 4:
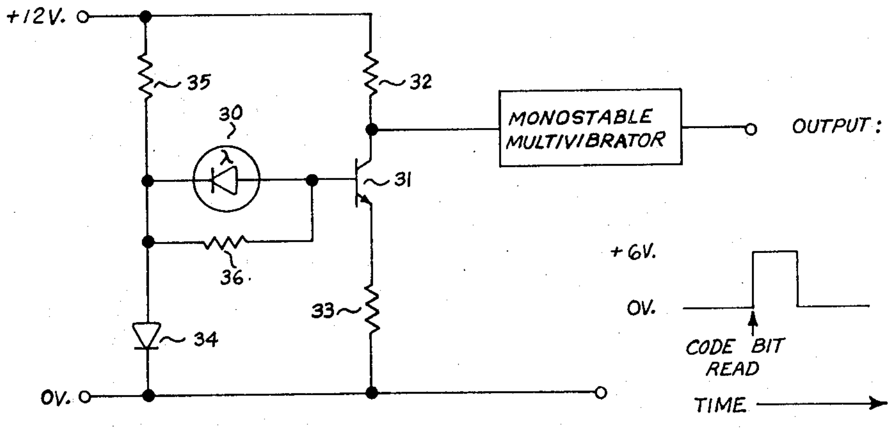

The 1 level amplifier and shaper 15 and the 0 level amplifier and shaper 16 may respectively have a circuit such as shown in FIG. 4. The circuit of FIG. 4 is identical to the circuit of FIG. 3 with the exception that a monostable or one-shot multivibrator is used in the output circuit of the transistor 31. When the light intensity on the solar cell 30 of FIG. 4 falls below some predetermined magnitude in response to a dark bit of indicia, the transistor 31 stops conducting. This condition triggers the monostable multivibrator so that it produces a pulse of plus 6 volts (logic 0) that has a predetermined time duration (determined by the circuit values of the monostable multivibrator). The circuit is preferably arranged so that only a short time of relatively low light intensity (indicating a code bit) is required to produce the logic 0 pulse. The monostable multivibrator is also arranged so that its output returns to zero volt (logic 1) sufficiently fast so that there is no overlap in time of a second sequential code bit being read.

The operation of the sequential code reader of the invention for the arrangement of the code shown in FIG. 1 will be explained in connection with the following table:

| Event | Presence amplifier output | 1 level bus | 0 level bus | Control bus | Resulting action |
|---|---|---|---|---|---|
| Carton just passed | 1 | 1 | 1 | 1 | FFC and FF1–5 in reset condition. |
| Carton sensed | 0 | 1 | 1 | 0 | FF1 set steered; FF1–5 released. |
| First bit read | 0 | 0 | 1 | 0 | FF1 set; FF2 set steered. |
| Second bit read | 0 | 0 | 1 | 0 | FF2 set; FF3 set steered. |
| Third bit read | 0 | 1 | 0 | 0 | FF3 set; FF4 set steered. |
| Fourth bit read | 0 | 0 | 1 | 0 | FF4 set; FF5 set steered. |
| Fifth bit read | 0 | 1 | 0 | 0 | FF5 set; diverter operated. |
| Stop reading code read | 0 | 0 | 0 | 1 | FFC set; FF1–5 reset. |
| Carton passes | 1 | 1 | 1 | 1 | FFC reset. |

In the above table, the condition of the presence amplifier output, the 1 level bus, the 0 level bus, and the control bus are shown by a logic 1 or a logic 0. After a carton has passed, the presence amplifier and shaper 14 output and the buses are all at a logic 1. The flip-flops FFC and FF1 through FF5 are in the reset condition. When a carton is sensed by the presence indicator 12, the presence amplifier and shaper 14 produces a logic 0 output. This logic 0 is applied to the gate 18 along with the logic 0 from the output terminal 1 of the now reset flip-flop FFC so that the gate 18 produces a logic 1. This logic 1 is inverted by the inverter 19 and supplied to the control bus as a logic 0. This logic set steers the flip-flop FF1, and releases the flip-flops FF1 through FF5 from a reset input.

Subsequently, the first coded bit is read. If this first bit is at the 1 level on the carton, the 1 level amplifier and shaper 15 puts the 1 level bus at a logic 0. With the arm of the switch S1 in the 1 position, the flip-flop FF1 receives a set trigger pulse and is set. When the flip-flop FF1 is set, it provides set steering for the flip-flop FF2.

In a similar manner, the second bit, if in the proper location, causes the flip-flop FF2 to become set and provide set steering for the flip-flop FF3. Likewise, the third, fourth, and fifth bits cause the flip-flops FF3, FF4, FF5 to become set. The 1 and 0 level buses change as indicated during this time. When the flip-flops FF1 through FF5 are set, all inputs to the gate 20 are at a logic 0 so that a logic 1 is produced and supplied to the diverter mechanism 21. This mechanism may perform any desired function such as diverting the carton at the associated lane or position. This diverting action may take appreciable time, but is arranged so that if the required logic has been supplied to the diverter mechanism 21, subsequent actions in the code reader will not affect this diverting.

When the stop reading code is read, both the 1 level bus and the 0 level bus are put at a logic 0. This causes the gate 17 to produce a logic 1 which sets the control flip-flop FFC. With the control flip-flop FFC set, its output terminal 1 supplies a logic 1 to the gate 18 which produces a logic 0. This logic 0 is inverted by the inverter 19 to a logic 1 which, when applied on the control bus, resets the flip-flops FF1 through FF5. This resetting of the flip-flops FF1 through FF5 prevents any further reading or action. As the carton moves by the readers, the readers may read the printed matter on the carton and the buses may be momentarily put at logic 0. However, once the control flip-flop FFC has been set, it will remain set as long as the presence amplifier and shaper 14 produces a logic 0, which it will until the carton passes. And with the control flip-flop FFC set, the control bus is held at a logic 1 and the flip-flops FF1 through FF5 cannot be set. Only after the carton passes is the control flip-flop FFC reset by a logic 1 from the presence amplifier and shaper 14. But this logic 1 also holds the control bus at logic 1. So, the flip-flops FF1 through FF5 are still held reset until another carton is sensed.

Subsequently, the carton passes beyond the presence light 11 and presence indicator 12 so that the presence amplifier and shaper 14 produces a logic 1 at its output. As mentioned, this resets the control flip-flop FFC. However, the logic 1 which reset the flip-flop FFC still causes the control bus to be at a logic 1 so that the flip-flops FF1 and FF5 remain reset. Thus, the condition of all flip-flops being reset is again provided and the action may be repeated for additional cartons.

If a carton passes the readers with a code arrangement which is different from the arrangement set up by the arms of the switches S1 through S5, this condition prevents a flip-flop from being set. While a subsequent coded bit may set that flip-flop, one set condition has been lost so that all flip-flops will not be set. The number of flip-flops which will not be set is the same as the number of improperly positioned bits with respect to the selected code for the flip-flops. Thus, after a predetermined time, the diverter mechanism will not be operated and all flip-flops will be reset by the stop scanning code.

It will thus be seen that the invention provides an improved and novel sequential code reader. The system in accordance with the invention requires only a reader at each of two levels, and does not require a relatively large number of readers such as would be needed for a simultaneous or multiple reading arrangement. In addition, the system is relatively insensitive to the incorrect position of a code on a carton. Further, the code may be easily changed and expanded to any number of bits, and still retain only the two readers.

While the invention has been discussed and explained in only one embodiment, persons skilled in the art will appreciate that modifications may be made. For example, other types of presence indicators may be used, such as a retroreflective scanner or a physical contact type of device. Also, the stop reading code may be omitted or may be replaced by a timing circuit. This timing circuit 37 enabled by closing switch 38 to contact 39 would be responsive to the presence of a carton as shown in FIG. 1 or responsive to the presence of the first coded bit (not shown), and would run for some predetermined time until all coded bits have been detected, after which it would disable and reset all flip-flops in the same manner as the stop reading code. And finally, other storage devices besides the flip-flops shown and described and other reading devices besides the circuits shown and described may be used. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A device for sequentially reading bits of coded indicia on a moving object, said indicia being selectively positioned on two rows, comprising means for sensing the presence of a moving object and producing a presence signal in response thereto; first means for reading one of said rows and producing a first signal in response to each bit of indicia read; second means for reading the other of said rows and producing a second signal in response to each bit of indicia read; a plurality of storage devices having a first and a second condition, said storage devices being coupled in a sequence and responsive to said presence signal so that each succeeding storage device in said sequence can be put in said first condition in response to the preceding storage device in said sequence being previously put in said first condition so that said storage devices will be put in said first condition in response to one of said first and said second signals being subsequently received thereby; and means respectively coupling predetermined ones of said storage devices to said first and second means.

2. A device for sequentially reading bits of coded indicia on a moving object, said indicia being selectively positioned on either of two spaced rows, comprising means for sensing the presence of a moving object and producing a presence signal in response thereto; first means for reading one of said rows and producing a first signal in response to each bit of indicia read; second means for reading the other of said rows and producing a second signal in response to each bit of indicia read; a plurality of storage devices that can be put in a set and reset condition, said storage devices being coupled in a sequence and responsive to said presence signal so that each succeeding storage device in said sequence can be set in response to the preceding storage device in said sequence being previously set and so that said storage devices will be set in response to one of said first and said second signals being subsequently received thereby; means respectively coupling predetermined ones of said storage devices to said first and second means; and means coupled to at least the last of said storage devices to produce an output signal in response to at least said last storage device being set.

3. A device for reading sequential bits of coded indicia on a moving object, said bits of indicia being selectively positioned on either of two spaced rows that extend along the direction of motion of said object, comprising means for sensing the presence of a moving object and producing a presence signal in response thereto; first means for reading one of said rows and producing a first signal in response to each bit of indicia read; second means for reading the other of said rows and producing a second signal in response to each bit of indicia read; a plurality of storage devices having a set and reset condition, said storage devices being coupled in a sequence and responsive to said presence signal so that each succeeding storage device in said sequence can be set in response to the preceding storage device in said sequence being previously set and so that said storage devices will be set in response to one of said first and said second signals being subsequently received thereby; means respectively coupling predetermined ones of said storage devices to said first and second means; means coupling the first of said storage devices to said sensing means; and means coupled to the last of said storage devices to produce an output signal in response to said last storage device being set.

4. In an arrangement wherein an article has a code comprising a plurality of bits of indicia on two rows, said bits being arranged in a predetermined sequence and spaced along said rows, a code reader comprising means for sensing the presence of said article and producing a presence signal in response to thereto; first means for sensing the presence of each bit in one of said rows and producing a first signal in response thereto; second means for sensing the presence of each bit in the other of said rows and producing a second signal in response thereto; a plurality of storage devices having a storage condition and an empty condition; means coupling said storage devices in a sequence with the first storage device in said sequence coupled to said presence sensing means so that said first storage device is enabled to be placed in said storage device in response to a presence signal and with the other of said storage devices in said sequence coupled to the preceding storage device so that each of said other storage devices is enabled to be placed in said storage condition in response to he preceding storage device being in said storage condition; and further means for selectively coupling each of said storage devices alternatively to said first means and to said second means so that said storage devices are placed in said storage condition in response to first being enabled and in response to subsequently being supplied with an alternative one of said first and second signals.

5. A code reader for a code comprising a plurality of bits of indicia, said bits being positioned in a predetermined manner and at spaced intervals along two rows, said reader comprising means for sensing the presence of said code and producing a presence signal in response thereto; first means for sensing the presence of each bit in one of said rows and producing a first signal in response thereto; second means for sensing the presence of each bit in the other of said rows and producing a second signal in response thereto; a corresponding plurality of storage devices having a storage condition and an empty condition; means coupling said storage devices in a sequence with the first storage device in said sequence coupled to said presence sensing means so that said first storage device is enable to be placed in said storage condition in response to a presence signal and with the other of said storage devices in said sequence coupled to the preceding storage device so that each of said other storage devices is enable to be placed in said storage condition in response to the preceding storage device being in said storage condition; and means for coupling each of said storage devices to a selected one of said first means and said second means so that the Nth storage device in said sequence is coupled to the one of said first and second means that senses the one of said first and second rows in which the Nth bit is positioned, where N is any integer.

6. A device for reading a code that comprises N, where N is an integer, bits of indicia on two rows, said bits being arranged in a predetermined manner and at spaced intervals along said rows, said device comprising means for sensing the presence and absence of said code and producing presence and absence signals in response thereto; first means for sensing the presence of each bit in one of said rows and producing a first signal in response thereto; second means for sensing the presence of each bit in the other of said rows and producing a second signal in response thereto; N storage devices having a storage condition and an empty condition; means coupling said storage devices in a sequence with the first storage device in said sequence coupled to said presence sensing means so that said first storage device is enable to be placed in said storage condition in response to a presence signal and with the other of said storage devices in said sequence coupled to the preceding storage device so that each of said other storage devices is enabled to be placed in said storage condition in response to the preceding storage device being in said storage condition; and means for selectively coupling each of said storage devices alternatively to either said first means or to said second means to corresponding with said predetermined manner of arrangement of said bits so that said storage devices are placed in said storage condition in response to first being enabled and in response to subsequently being supplied with the selected first or second signal.

7. The device of claim 6 and further including means coupled to the last of said storage devices in said sequence for producing an output signal in response to said last storage device being in said storage condition.

8. The device of claim 6 and further including means coupled to all of said storage devices in said sequence for producing an output signal in response to all of said storage devices being in said storage condition.

9. The device of claim 6 and further including means coupled to said first and second means and to said storage devices in said sequence for placing said storage devices in said sequence in said empty condition in response to bits in both of said two rows at the same interval.

10. The device of claim 6 and further including means coupled to said sensing means and to said storage devices in said sequence for placing said storage devices in said sequence in said empty condition following a predetermined time after said presence signal is produced.

11. A code recognition system for recognizing bits of coded indicia on a moving object comprising, a presence sensor for sensing the presence of the object; code sensing means for serially sensing the coded indicia; code registration means containing a preset code number; said code registration means being enable by a presence indication to serially respond to the coded indicia as serially sensed by said code sensing means and provide an output only when the coded indicia coincides with the preset code number.

12. A code recognition system for recognizing bits of coded indicia on a moving object comprising, a presence sensor for sensing the presence of the object, code sensing means for serially sensing the coded indicia, code registration means containing a preset code number, said code registration means being enabled by a presence indication to serially respond to the coded indicia as serially sensed by said code sensing means and provide an output only when the coded indicia coincides with the preset code number, said code registration means comprising a plurality of storage means one for each bit of coded indicia, each storage means enabling the next succeeding storage means to respond to sensed bits of coded indicia only if the immediately preceding storage means responded to a previously sensed bit of code indicia.

13. An arrangement for recognizing predetermined coded indicia on a moving object, said indicia comprising a plural integral number of bit positions arranged along a plurality of rows, said bit positions being arranged in a predetermined pattern in spaced intervals along said rows, means for sensing the arrival of each moving object to provide a corresponding presence signal, means operative after the sensing of the presence of a moving object for sequentially sensing the presence and absence of a bit in each bit pattern of each of said rows to produce serial pulse trains representative of the respective coded bit patterns associated with each of said rows, a plurality of pairs of bistable storage devices each associated with a respective bit position, means for selectively presetting one of the bistable storage devices of each pair of said bistable storage devices to desired ones of said states corresponding to said predetermined pattern of bits, means responsive to said presence signal and to each of said serial pulse patterns to modify the states of the other of the bistable storage devices of each pair of said devices in accordance with said serial pulse patterns, means responsive to a predetermined coded pattern of said modified states of said other of said devices of each pair of said devices for utilizing said code, and means for returning the states of said other of said devices of each pair of said devices to their original states after all of the bits associated with said serial pulse trains have been sequentially sensed.

14. An arrangement according to claim 13 further comprising a first source of control signals, and means responsive to said first signals for returning said devices to said initial state.

15. An arrangement according to claim 13 wherein•said means for sequentially sensing the presence and absence of a bit in each bit position comprises a respective sensing means associated with each row, said sensing means normally being inoperative, a source of second control signals and means responsive to said second control signals for rendering said sensing means operative to sense said bits of indicia.

16. An arrangement according to claim 13 wherein said means for sequentially sensing the presence and absence of a bit in each bit position comprises a respective sensing means associated with each row, said sensing means normally being inoperative, a source of second control signals, means responsive to said second control signals for rendering said sensing means operative to sense said bits of indicia, a source of third signals, and means responsive to said third signals for rendering said sensing means inoperative after having been rendered operative in response to said second signals.

17. An arrangement according to claim 13 further comprising a control signal, means having a given time of operation responsive to said control signal for returning said devices in said initial state after elapse of said given time.

18. An arrangement for recognizing predetermined coded indicia on a moving object, said indicia comprising a plural integral number of bit positions arranged along a plurality of rows, said bit positions being arranged in a predetermined pattern in spaced intervals along said rows, means for sensing the arrival of each object, means operative after the sensing of the presence of an object for sequentially sensing the presence and absence of a bit in each bit position of said rows to produce pulse trains representative of the respective bit patterns associated with each of said rows, a normally inoperative utilization means, a plurality of associated pairs of first and second bistable devices, means for presetting said first bistable devices to desired states corresponding to said predetermined pattern, means for serially comparing the pattern of pulses in said pulse trains with the pattern of states of said first bistable devices, means responsive to the sensing of an object and to a correspondence between said pattern of pulses and said pattern of states of said first bistable devices to modify the states of said second bistable devices, means responsive to the modified states of said second bistable devices to render said utilization means operative, and means for returning the states of said second bistable devices to their original states after all of the bits associated with said serial pulse trains have been sequentially sensed.

19. An arrangement according to claim 18 wherein said means for sequentially sensing the presence and absence of said bits comprises a respective sensor associated with each row.

20. An identification system for an object carrying a first series of code marks and a second series of code marks, said first series of code marks being arranged on one side of a code center line and representing by their occurrence a logic 1, said second series of marks being arranged on the other side of said code center line and representing by their occurrence a logic 0, means for sensing the arrival of said object, a code controlled arrangement operative a predetermined time after sensing of said object for separately reading said first set of code marks to produce the first pulse train and for separately reading said second set of code marks to produce a second pulse train, a binary stable storage device, means for storing a particular binary number in said device by modifying the states of said device, a logic system responsive to sensing of the arrival of said object and to said first and second pulse trains for comparing the series of simultaneous occurrences and nonoccurrences of code marks in said first and second sets of code marks with the particular binary number condition of said storage device, and means responsive only to a predetermined comparison thereof for producing an output signal.

21. A selection system for use with a moving object bearing a pattern of code marks, comprising a plurality of light sensitive units arranged to scan noncollinear parallel paths, respectively, along the length of said object, a chain of pulse forming circuits, each circuit being arranged to be operated from one bistable state to a second bistable state to produce an output pulse, means responsive to the arrival of said moving object to produce a presence signal, the first circuit requiring both a presence signal and a primary input signal to produce an output pulse, the output of each of the circuits but the last in the chain being connected to serve as the secondary input to the next later circuit in the chain, the output of the last circuit being adapted for connection to a load, the circuits of the chain being adapted for connection to the light sensitive units in a predetermined order to correspond with a predetermined pattern of code marks of which selection is desired, whereby the light sensitive units will provide input signals to the circuits in a predetermined sequence which will permit an output pulse to be obtained from the last of the circuits in the chain, and means responsive after the primary input signals have been provided to the circuits for operating said circuits to return them to their one bistable states.